G. W. WATTS.
NUT LOCK.
APPLICATION FILED JUNE 1, 1916.

1,259,177.

Patented Mar. 12, 1918.

WITNESSES
John X. Phillips Jr.
Myron L. Clear

INVENTOR
GEORGE W. WATTS,
BY
ATTORNEYS

UNITED STATES PATENT OFFICE.

GEORGE WILBER WATTS, OF PEORIA, ILLINOIS.

NUT-LOCK.

1,259,177.  Specification of Letters Patent.  Patented Mar. 12, 1918.

Application filed June 1, 1916. Serial No. 101,102.

*To all whom it may concern:*

Be it known that I, GEORGE W. WATTS, a citizen of the United States, and a resident of Peoria, in the county of Peoria and State of Illinois, have invented a certain new and useful improvement in Nut-Locks, of which the following is a specification.

My present invention relates to nut locks of that type in which a set screw is threaded through the nut for engagement with the threads of the bolt to lock the nut in connection with the bolt.

More particularly my present invention relates to certain improvements upon the construction described and claimed in my Patent #1,142,647.

In the accompanying drawings which illustrate my present improvement:

Figure 3:
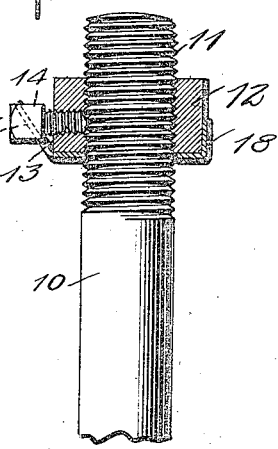
Fig. 3 is a vertical section taken substantially on line 3—3 of Fig. 1.

On a bolt 10 having threaded portion 11, is located a nut 12 having a threaded opening in one side that receives a set-screw 13, whose polygonal head 14, is engaged as shown in Fig. 3 by extensions 15 of a locking plate 16 whereby rotation of set-screw is prevented.

Figure 2:
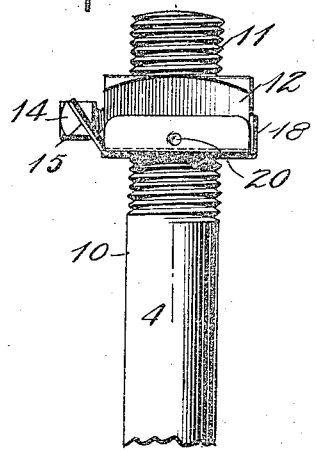
Fig. 2 is a similar view looking in another direction.
Figure 4:
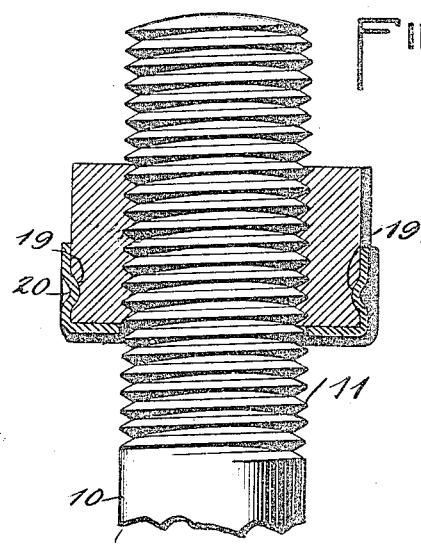
Fig. 4 is a similar view, enlarged and taken on line 4—4 of Fig. 2.
Figure 5:
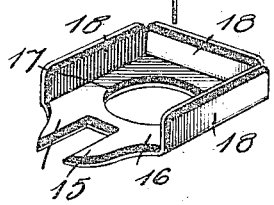
Fig. 5 is a detailed perspective view of the locking plate removed.
Figure 6:
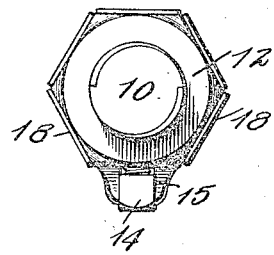
Fig. 6 is a top plan view of the parts shown in Fig. 1.

In accordance with my present improvement, the locking plate 16 has a central opening 17 movable readily on to the bolt 10 and is also provided with angular flanges 18 upon three sides thereof for extension partially along the side faces of the nut 12, these side faces of the nut having, as seen in Fig. 4, recesses or indentations 19 into which the material of the flanges 18 is indented at 20 in Fig. 2 through the use of a set punch or like implement in order to secure the locking plate in connection with the nut so as to be freely movable therewith when the nut is screwed upon the bolt, in position between the nut and the parts to be engaged and thus away from all danger of displacement.

Figure 1:
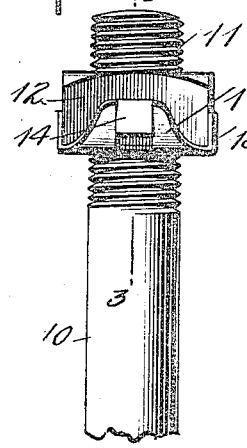
Figure 1 is a side elevation illustrating the practical application of my invention.

This association of the nut and the locking plate also maintains the latter in position at all times in connection with the nut for ready bending of the locking plate extensions 15 to the position shown in Figs. 1, 2 and 3 to lock the set screw 13 against displacement.

It is apparent that in this improvement, the nut is first of all locked by turning the set screw firmly against the bolt threads and the set screw itself is then locked by bending the extensions of the locking plate in order to firmly hold the several parts in connected position.

I claim:

The combination with a bolt, a nut threaded thereon, a set-screw threaded through one side of the said nut for engagement with the bolt, and the locking plate having angular lateral extensions for embracing the head of the set-screw to lock the latter in position said nut having indentures in its flat side, the said locking plate having side flanges extending over a portion of the flat faces of the nut and provided with projections extending into said indentures of the nut as shown and described.

GEORGE WILBER WATTS.